Patented Feb. 13, 1940

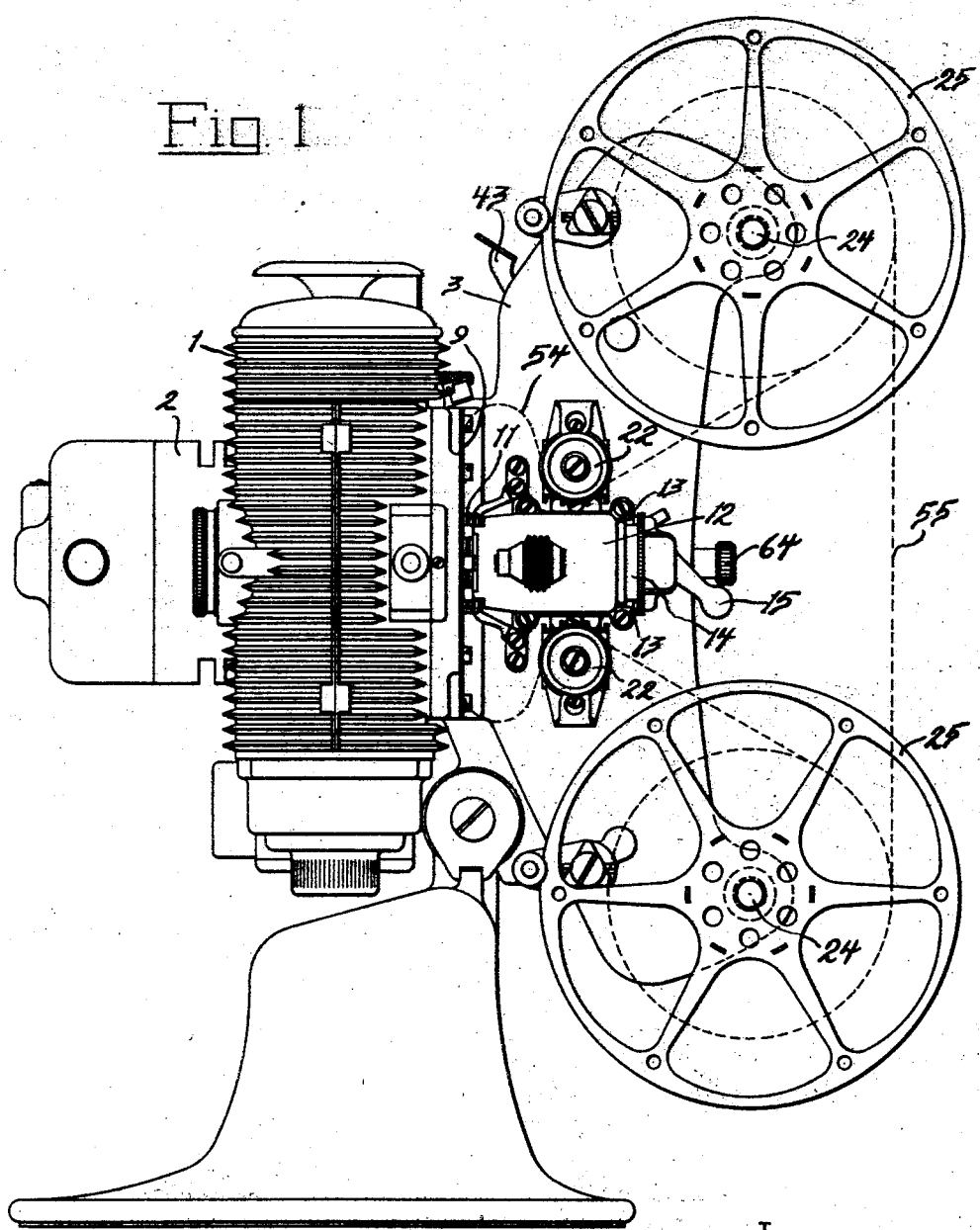

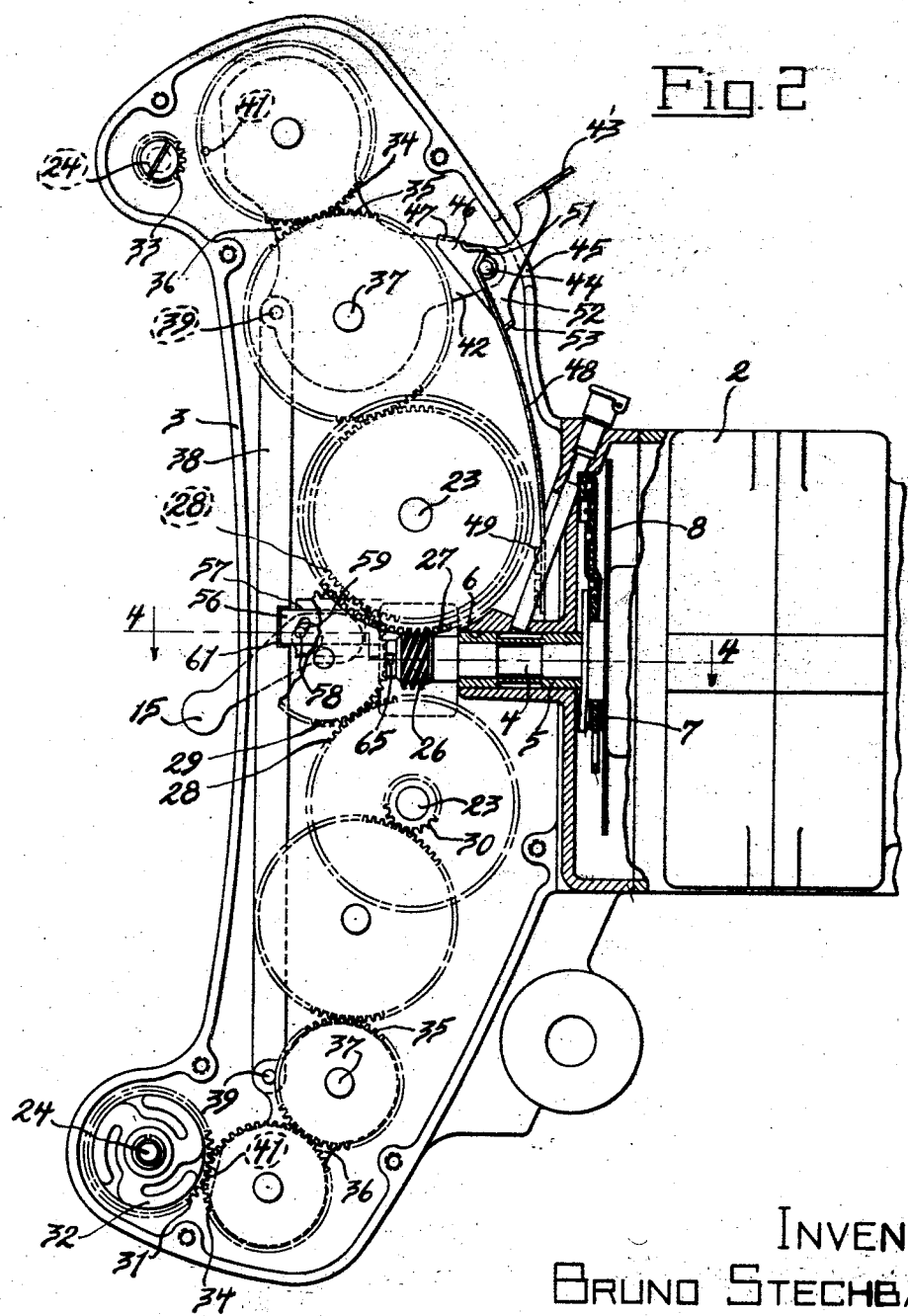

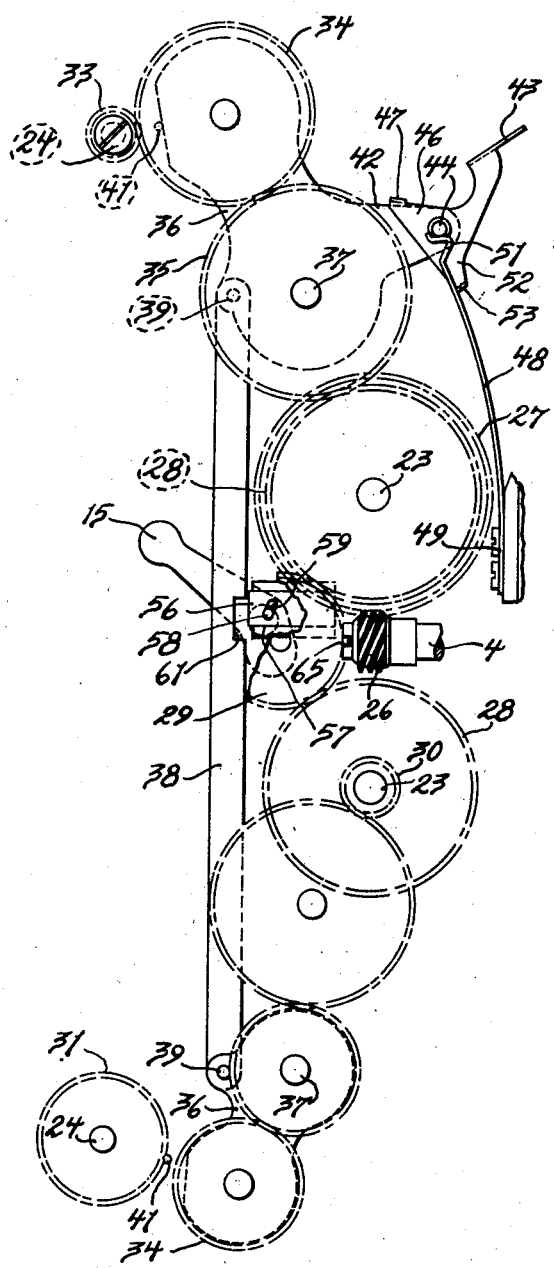

2,190,198

UNITED STATES PATENT OFFICE 2,190,198

MOTION PICTURE PROJECTING MACHINE

Bruno Stechbart, Chicago, Ill., assignor to The Bell & Howell Company, Chicago, Ill., a corporation of Illinois Application August 28, 1936, Serial No. 98,367

7 Claims. (Cl. 88—17)

My invention has for its general object the provision of a novel and effective means for driving the film reels of a motion picture projecting machine, particularly with reference to the provision of means for conveniently rewinding the film after projection, all with a view toward simplicity and ease and convenience of control and desirable enclosure of operating parts.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 1 is a side elevation of a motion picture projecting machine embodying my invention;

Figure 2 is an enlarged partial opposite side elevation of the machine with parts removed, broken away and shown in section;

Figure 3 is a view, in side elevation similar to Figure 2, of the driving gearing and control mechanism thereof with parts shown in different positions than those in which they are shown in Figure 2;

Figure 4 is a partial sectional view substantially on the line 4—4 of Figure 2 and with parts further broken away and shown in section;

Figure 5 is a partial sectional view substantially on the line 5—5 of Figure 4; and Figure 6 is a front elevation of the manually actuated film gate control member, hereinafter described.

Referring to the drawings, the frame of the machine involves a hollow rear portion comprising a lamp house 1 and a rear hollow mechanism frame portion 2 disposed at one side of the lamp house, and a continuous front frame portion 3 of flat form arranged in a forwardly and rearwardly disposed plane and extending vertically in front of the rear portion 2 and vertically in both directions therefrom, see Figures 1 and 2.

The rear portion of the portion 2 encloses an electric motor, not shown, the rotatable shaft 4 of which extends forwardly and rearwardly and the front portion of which extends through and is journaled in a bearing 5 carried in an extended bore 6 through the rear wall of the portion 3.

An intermittent film feed mechanism, generally designated at 7, and a light shutter 8 are arranged within the rear frame portion 2 and are associated with the shaft 4 to be actuated thereby, see Figures 1 and 2.

Arranged in front of the lamp house 1 and to one side of the front frame portion 3, is an apertured film feed guide including a rear face guide plate 9 and a front face guide or gate 11, the intermittent feed mechanism serving to intermittently feed a film through the feed guide and the shutter 8 functioning in timed relation therewith in the usual manner, see Figure 1.

A carrier member 12 is slidably mounted, as designated at 13, for forward and rearward movement on the intermediate portion of a side wall of the front frame portion 3 and carries the gate 11 and a projection lens 14, so that the gate may be positioned rearwardly in film retaining position and forwardly out of film retaining position for the lacing and unlacing of a film in the guide, see Figures 1 and 5.

A manually actuated member 15 is provided with a cylindrical bearing portion 16 which is pivotally mounted on a transverse axis in a bore 17 through the side wall of the front frame portion 3 upon which the carrier member 12 is mounted. See Figures 4, 5 and 6. The carrier member 12 is provided with a vertical channel 18 facing said side wall, and a slide block 19 is slidably engaged in said channel. A crank stud 21 on the member 15 is journaled in the slide block 19, so that pivotal movement of the member 15 effects forward and rearward movement of the carrier member 12 to open and close the film feed guide.

Transversely disposed vertically spaced revoluble film sprockets 22 are carried intermediately on the front frame portion 3 and are disposed above and below the carrier member 12, revoluble shafts 23 fixed with the sprockets extending within the frame portion 3, see Figures 1, 2 and 3.

Transversely disposed vertically spaced revoluble reel spindles 24 are carried on the front frame portion 3 in the regions of its ends, these spindles extending within the frame portion 3 and the projecting ends thereof being adapted to have film reels 25 detachably mounted thereon in driving engagement therewith.

The front end of the motor shaft 4 projects into the front frame portion 3 and has a spiral gear pinion 26 fixed thereon within this frame portion. A spiral gear 27, within the frame portion 3, is fixed on the upper sprocket shaft 23 and meshes with the pinion 26 for driving the upper sprocket shaft, see Figures 2, 3 and 4.

Spur gears 28 within the front frame portion 3 are arranged correspondingly with the plane thereof and are fixed on the sprocket shafts 23, and a similarly arranged spur gear 29 is rotatably mounted within this frame portion and meshes with the gears 28, so that the sprocket shafts 23 and the sprockets 22 are driven together from the mechanism of the machine in the same direction.

Spur gear trains, individual to the reel spindles 24 and carried within the front frame portion with their planes corresponding with the plane thereof, are provided for driving the reel spindles from the sprocket shafts 23 and the mechanism of the machine, the upper gear train being inclusive of the upper gear 28 and the lower gear train being inclusive of a spur gear pinion 30 fixed on the lower sprocket shaft.

The spur gear train which drives the lower reel spindle is also inclusive of a final drive gear 31 disposed coaxially of the lower reel spindle and having a frictional driving connection therewith, generally designated at 32. The spur gear train which drives the upper reel spindle is inclusive of a final drive gear 33 fixed on the upper reel spindle.

These spur gear trains are also inclusive of final idler gears 34, the upper gear 34 of which is adapted to mesh with the gear 33 to drive the upper reel spindle, and the lower gear 34 of which is adapted to mesh with the gear 31 to drive the lower reel spindle. These spur gear trains are also inclusive of intermediate idler gears 35 which mesh with the final idler gears 34 for driving the same.

Plates 36 are disposed within the front frame portion 3 with their planes corresponding with the plane thereof. See Figures 2 and 3. These plates are pivoted for movement in their planes on studs 37 carried on the front frame portion and on which the intermediate idler gears 35 are rotatably mounted, the plates being thus pivotally mounted on the axes of the intermediate idler gears.

The upper plate 36 carries the upper final idler gear 34 for movement into and out of mesh with the final drive gear 33 of the upper reel spindle, and the lower plate 36 carries the lower final idler gear 34 for movement into and out of mesh with the final drive gear 31 of the lower reel spindle.

A vertically extending link 38 within the front frame portion 3 has its ends pivotally connected, as designated at 39, with the plates 36 for simultaneously shifting the plates and the final idler gears 34, the arrangement being such that the gears 34 are alternately meshed with the final drive gears 31 and 33 for alternately driving the reel spindles 24 and reels 25 mounted on the reel spindles, stop pins 41 on the frame portion 3 being engageable by the plates 36 to limit movement thereof.

The upper plate 36 is provided with a rearwardly projecting arm 42, and an actuating lever 43 is pivotally mounted, by means of a stud 44 on the outer end of this arm, on an axis normal to the shifting plane of the upper plate 36, the lever 43 projecting rearwardly through a slot 45 in the adjacent wall of the front frame portion 3 for the manual actuation thereof.

The lever 43 is provided with a forwardly projecting arm 46 which is provided with a transverse end portion 47 overlying the arm 42 and engageable downwardly thereagainst to form a one way operative connection therewith for actuating the plates 36 with upward movement of the lever 43 into position in which the upper final idler gear 34 meshes with the upper final drive 33 to drive the upper reel spindle 24, as shown in Figure 3.

A spring 48 has one end secured, as designated at 49, to the intermediate portion of the rear wall of the front frame portion 3 and extends upwardly. See Figures 2 and 3. The upper or free end of the spring 48 is provided with a rearwardly projecting latching formation 51 rearwardly engageable oppositely with the stud 44 to latch the shifting plates 36 in their opposite positions, the arrangement being such that in the position, see Figure 3, in which the upper reel spindle is driven, the spring 48 substantially positively locks the shifting plates 36. This substantially positive lock prevents accidental disengagement of the upper final idler gear 34 from the final drive gear 33 driving the upper reel spindle, the driving of the upper reel spindle being for the purpose of rewinding a film after projection and the upper gear train being proportioned for high speed rewinding which increases the tendency for accidental disengagement of the gears 34 and 33.

The lever 43 is provided with a downwardly projecting arm 52 which is provided with a transverse end portion 53 forwardly engageable against the spring 48 a short distance below the latching formation 51 to form a one way operative engagement therewith.

Assuming the lever 43 to be in its upper position, as shown in Figure 3, downward pressure thereon serves to move the upper end of the spring 48 forwardly to release the aforesaid substantially positive engagement of the latching formation 51 with the stud 44, and the engagement of the transverse end portion 43 with the spring forms a reaction engagement cooperating with the pivotal mounting of the lever 43 on the arm 42, exemplified by the stud 44, to move the arm 42 downwardly with downward movement of the lever 43 and to shift the lower final idler gear 34 into engagement with the final drive gear 31 for the driving of the lower reel spindle to take up a film during projection, as shown in Figure 2, the latching formation 51 of the spring 48 engaging the stud 44 to releasably latch the parts in this position.

In the operation of the machine for projecting a film, the lower reel spindle is driven to take up the film, see Figure 2, the film being drawn from the upper reel 25 and laced on the constant feed sprockets 22 and through the guide, and the carrier member 12 being positioned rearwardly with the gate 11 in film guiding position, as shown in Figure 1. The projecting film path is indicated at 54 in Figure 1.

In the operation of the machine for rewinding a film on the upper reel 25 from the lower reel 25, the upper reel spindle is driven to rewind the film from the lower reel, see Figure 3. In rewinding the film is disengaged from the sprockets 22 and the exposure guide, the rewind film path being indicated at 55 in Figure 1.

In order to prevent the driving of the upper reel spindle 24 when the gate 11 is in its rearward film guiding position and to prevent the positioning of the gate 11 in its rearward film guiding position when the shift gears are positioned to drive the upper reel spindle, the following is provided.

A slide block 56 is mounted for forward and rearward movement in a slide 57 on the inside of the intermediate portion of the side wall of the front frame portion 3 on which the actuating member 15 is mounted, the gear 29 serving to retain the slide block 56 in its slide. See Figures 2, 3 and 4.

A crank stud 58, on the actuating member 15, engages in a slot 59 in the slide block 56 to position this slide block forwardly when the gate 11 is in its rearward film guiding position and to position this slide block in its forward or open position for lacing.

The link 38 is provided at its intermediate portion with a rearwardly facing transverse slot 61. This slot is arranged to register with the slide block 56 when the lower final idler gear 34 is meshed with the final drive gear 31 for driving the lower reel spindle to take up the film during projection, see Figure 2.

In this position of the link 38 the slide block 56 may be moved forwardly into the slot 61, and the arrangement is such that, in the forward position of the slide block 56, the gate 11 is in its rearward film retaining position for projection, engagement of the slide block 56 in the slot 61 preventing shifting of the final idler gears 34 to drive the upper reel spindle for rewinding when the gate is in its rearward film guiding position, see Figure 2.

When the link 38 is positioned with the upper final idler 34 meshed with the final drive gear 33 for rewinding, the slot 61 is out of registry with the slide block 56 so that the slide block is prevented by the link from being moved forwardly, as shown in Figure 3, and the gate 11 cannot be moved into its rearward film guiding position.

Accordingly, the gate 11 cannot be moved to its film guiding position when the upper reel spindle is driven for rewinding, and the lower reel spindle must be driven when the gate is in its film guiding position.

In order to manually actuate the shaft 4 to position the shutter 8 for the projection of a frame of the film, the following is provided.

A shaft 62 is mounted in an extended bore 63 through the front wall of the front frame portion 3 in axial alinement with the shaft 4 for rotation and axial movement, the forward end of the shaft 62 being provided with a forward head 64 exterior of the frame portion 3 for the manual manipulation thereof, see Figures 1 and 4.

The forward end of the shaft 4 is provided with a diametrical slot or clutch formation 65, and the rear end of the shaft 62 is provided with a diametrical key or clutch formation 66 engageable with the slot 65 in the rearward position of the shaft 62 for manually rotating the shaft 4 and with it the shutter 8 from the shaft 62.

In the forward position of the shaft 62, see Figure 4, the key is disengaged from the slot 65, so that the shaft 4 may rotate during motion picture projection independently of the shaft 62. A helical compression spring 67 encircles the shaft 62 within an enlarged forward portion of the bore 63 and, reacting on the frame portion 3, normally maintains the shaft 62 in its forward position disengaged from the shaft 4.

Assuming the shaft 4 not being driven by the motor, the shaft 62 is moved rearwardly and rotated to effect the proper angular position of the shutter 8 for still picture projection, the spring 67 moving the shaft 62 forwardly into disengaged position upon release of this shaft.

Having thus described my invention, I do not wish to be limited to the precise details described as changes may be readily made without departing from the spirit of my invention, but having thus described my invention, I claim as new and desire to secure by Letters Patent the following:

1. In a motion picture projecting machine the combination of a film feed gate movable into and out of film guiding position, two film reel members, manually actuated means shiftable into opposite positions for alternately driving said reel members, a manually actuated pivotally mounted member, an operative connection between said pivotally mounted member and said gate whereby pivotal movement of said pivotally mounted member effects said movement of said gate, and interlock means operative between said shiftable means and said pivotally mounted member adapted to lock one thereof in one position by positioning the other in one position.

2. In a motion picture projecting machine the combination of a film feed gate movable into and out of film guiding position, two film reel members, manually actuable means including a substantially lineally movable member shiftable into opposite positions for alternately driving said reel members, a manually actuated pivotally mounted member, an operative connection between said pivotally mounted member and said gate whereby pivotal movement of said pivotally movable member effects said movement of said gate, and interlock means operative between said lineally movable member and said pivotally mounted member including a second substantially lineally movable member having a path of movement substantially normal to that of said first mentioned lineally movable member, said lineally movable members being adapted to cooperate to lock one thereof in one position by positioning the other in one position.

3. In a motion picture projecting machine the combination of a hollow mechanism frame portion of flat form arranged in a forwardly and rearwardly disposed plane and extending vertically, a film feed gate, a mounting carrying said gate on one side of the intermediate portion of said frame portion for movement forwardly and rearwardly, transversely disposed revoluble reel spindles carried on said frame part in the regions of its ends, spur gear trains individual to said spindles and disposed within said frame portion and disposed correspondingly with the plane thereof for driving said reel spindles from the intermediate portion of said frame portion, shiftable means within said frame portion and carrying gears of said trains for alternate gear engaging and disengaging movement including a vertically movable member, and interlock means operative between said gate and said vertically movable member adapted to lock one thereof in one position by positioning the other in one position.

4. In a motion picture projecting machine the combination of a hollow mechanism frame portion of flat form arranged in a forwardly and rearwardly disposed plane and extending vertically, a film feed gate, a mounting carrying said gate on one side of the intermediate portion of said frame portion for movement forwardly on rearwardly, transversely disposed revoluble reel spindles carried on said frame part in the regions of its ends, spur gear trains individual to said spindles and disposed within said frame portion and disposed correspondingly with the plane theroef for driving said reel spindles from the intermediate portion of said frame portion, vertically spaced shifting plates carried within said frame portion for pivotal movement in their planes corresponding with the plane of said frame portion and carrying gears of respective of said trains for gear engaging and disengaging movement, a vertically extending link within said frame portion and pivotally connected with said shifting members for alternately engaging the gears carried by said shifting plates, a manually actuated member pivoted on a transverse axis on said side of said frame portion, an operative connection between said manually actuated member and said gate whereby pivotal movement of said manually actuated member effects forward and rearward movement of said gate, and interlock means operative between said pivoted member and said link adapted to lock one thereof in one position by positioning the other in one position.

5. In a motion picture projecting machine the combination of a hollow mechanism frame portion of flat form arranged in a forwardly and rearwardly disposed plane and extending vertically, a film feed gate, a mounting carrying said gate on one side wall of the intermediate portion of said frame portion for movement forwardly and rearwardly, transversely disposed revoluble reel spindles carried on said frame part in the regions of its ends, spur gearing within said frame portion and disposed correspondingly with the plane thereof for driving said reel spindles from the intermediate portion of said frame portion, manually actuable means shiftable into opposite positions for alternately driving said spindles including a member substantially lineally movable vertically, a manually actuated member pivotally mounted in a bore through said side wall, an operative connection between said pivotally mounted member and said gate whereby pivotal movement of said pivotally mounted member effects said movement of said gate, an interlock member within said frame portion and mounted for movement forwardly and rearwardly and having an interlocking relation with said vertically lineally movable member, and an operative connection between said interlock member and said pivotally mounted member whereby said interlock member is actuated by said pivotally mounted member.

6. In a motion picture projecting machine the combination of two revoluble reel members, means shiftable into opposite positions for alternately driving said reel members from the mechanism of the machine, spring latch means operative to maintain said shiftable means in at least one of said positions and adapted to substantially positively lock said shiftable means in said position, an actuating member, and means for oppositely actuating said shiftable means with opposite movement of said actuating member including an operative engagement between said actuating member and said spring means adapted to at least partially release said spring means with reference to said positive lock as an incident of actuation of said actuating member in the direction to shift said shiftable means from its said positively locked position.

7. In a motion picture projecting machine the combination of two revoluble reel members, means including a member shiftable into opposite positions for alternately driving said reel members from the mechanism of the machine, spring latch means operative to maintain said shiftable member in both of said positions and adapted to substantially positively lock said shiftable member in one of said positions, an actuating member pivotally mounted on said shiftable member on an axis normal to the shifting plane thereof, a one way operative engagement between said actuating member and said spring forming a reaction engagement therewith with reference to said pivotal mounting and adapted to at least partially release said spring means with reference to said positive lock as an incident of actuation of said actuating member in the direction to shift said shiftable member from its said positively locked position, and an oppositely acting positive one way operative engagement between said actuating member and said shiftable member adapted to shift said shiftable member to the position opposite said positively locked position thereof with actuation of said actuating member in the direction opposite said first mentioned direction thereof.

BRUNO STECHBART.